United States Patent
Huang

(12) 
(10) Patent No.: US 6,753,107 B2
(45) Date of Patent: Jun. 22, 2004

(54) INTEGRATED FUEL CELL SYSTEM

(75) Inventor: Wayne W. Huang, Latham, NY (US)

(73) Assignee: Plug Power Inc., Latham, NY (US)

( * ) Notice: Subject to any disclaimer, the term of this patent is extended or adjusted under 35 U.S.C. 154(b) by 192 days.

(21) Appl. No.: 10/121,340

(22) Filed: Apr. 12, 2002

(65) Prior Publication Data

US 2002/0160241 A1 Oct. 31, 2002

Related U.S. Application Data

(60) Provisional application No. 60/287,025, filed on Apr. 27, 2001.

(51) Int. Cl.[7] .................................................. H01M 8/06
(52) U.S. Cl. .......................................... 429/17; 429/19
(58) Field of Search ...................................... 429/17, 19

(56) References Cited

U.S. PATENT DOCUMENTS

6,207,307 B1 * 3/2001 Van Keulen .................. 429/19
6,322,917 B1 * 11/2001 Acker ........................... 429/17
2003/0190503 A1 * 10/2003 Kumar et al. ................. 429/17

* cited by examiner

*Primary Examiner*—John S. Maples
(74) *Attorney, Agent, or Firm*—Trop, Pruner & Hu, P.C.

(57) ABSTRACT

A simplified PEM fuel cell system is integrated with a fuel processor and an exhaust gas oxidizer to ensure clean emissions. The fuel cell has an operating temperature of 100–200° C., and utilizes reformate fuel having a carbon monoxide level greater than 1000 parts per million.

20 Claims, 4 Drawing Sheets

INTEGRATED FUEL CELL SYSTEM

CROSS REFERENCE TO RELATED APPLICATIONS

This application claims priority under 35 USC 119(e) from U.S. Provisional Application No. 60/287,025, filed Apr. 27, 2001, naming Huang as inventor, and titled "INTEGRATED FUEL CELL SYSTEM." That application is incorporated herein by reference in its entirety and for all purposes.

GOVERNMENT INTEREST

The Government of the United States of America has rights in this invention pursuant to Contract No. NIST-70NAN8H4039 awarded by the U.S. Department of Commerce, National Institute of Standards and Technology.

BACKGROUND

The invention generally relates to an integrated fuel cell system.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations (1) and (2):

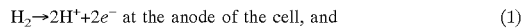
$H_2 \rightarrow 2H^+ + 2e^-$ at the anode of the cell, and (1)

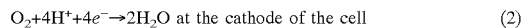
$O_2 + 4H^+ + 4e^- \rightarrow 2H_2O$ at the cathode of the cell (2)

A typical fuel cell has a terminal voltage of up to approximately one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow channels and diffuse through the GDLs to reach the PEM. The PEM and its adjacent pair are often assembled together in an arrangement called a membrane electrode assembly (MEA).

A fuel cell system may include a fuel processor that converts a hydrocarbon (natural gas or propane, as examples) into a fuel flow for the fuel cell stack. Exemplary fuel processor systems are described in U.S. Pat. Nos. 6,207,122, 6,190,623, 6,132,689, which are hereby incorporated by reference.

The two reactions which are generally used to convert a hydrocarbon fuel into hydrogen are shown in equations (3) and (4).

$\frac{1}{2}O_2 + CH_4 \rightarrow 2H_2 + CO$ (3)

$H_2O + CH_4 \rightarrow 3H_2 + CO$ (4)

The reaction shown in equation (3) is sometimes referred to as catalytic partial oxidation (CPO). The reaction shown in equation (4) is generally referred to as steam reforming. Both reactions may be conducted at a temperature from about 600–1,100° C. in the presence of a catalyst such as platinum. A fuel processor may use either of these reactions separately or both in combination. While the CPO reaction is exothermic, the steam reforming reaction is endothermic. Reactors utilizing both reactions to maintain a relative heat balance are sometimes referred to as autothermal (ATR) reactors. It should be noted that fuel processors are sometimes generically referred to as reformers, and the fuel processor output gas is sometimes generically referred to as reformate, without respect to which reaction is employed.

As evident from equations (3) and (4), both reactions produce carbon monoxide (CO). Such CO is generally present in amounts greater than 10,000 parts per million (ppm). Because of the high temperature at which the fuel processor is operated, this CO generally does not affect the catalysts in the fuel processor. However, if this reformate is passed to a prior art fuel cell system operating at a lower temperature (e.g., less than 100° C.), the CO may poison the catalysts in the fuel cell by binding to catalyst sites, inhibiting the hydrogen in the cell from reacting. In such systems it is typically necessary to reduce CO levels to less than 100 ppm to avoid damaging the fuel cell catalyst. For this reason the fuel processor may employ additional reactions and processes to reduce the CO that is produced. For example, two additional reactions that may be used to accomplish this objective are shown in equations (5) and (6). The reaction shown in equation (5) is generally referred to as the shift reaction, and the reaction shown in equation (6) is generally referred to as preferential oxidation (PROX).

$CO + H_2O \rightarrow H_2 + CO_2$ (5)

$CO + \frac{1}{2}O_2 \rightarrow CO_2$ (6)

Various catalysts and operating conditions are known for accomplishing the shift reaction. For example, the reaction may be conducted at a temperature from about 300–600° C. in the presence of supported platinum. Other catalysts and operating conditions are also known. Such systems operating in this temperature range are typically referred to as high temperature shift (HTS) systems. The shift reaction may also be conducted at lower temperatures such as 100–300° C. in the presence of other catalysts such as copper supported on transition metal oxides. Such systems operating in this temperature range are typically referred to as low temperature shift (LTS) systems. Other catalysts and operating conditions are also known. In a practical sense, typically the shift reaction may be used to lower CO levels to about 1,000–10,000 ppm, although as an equilibrium reaction it may be theoretically possible to drive CO levels even lower.

The PROX reaction may also be used to further reduce CO. The PROX reaction is generally conducted at lower temperatures than the shift reaction, such as 100–200° C. Like the CPO reaction, the PROX reaction can also be conducted in the presence of an oxidation catalyst such as platinum. The PROX reaction can typically achieve CO levels less than 100 ppm (e.g., less than 50 ppm).

In general, fuel cell power output is increased by raising fuel and air flow to the fuel cell in proportion to the stoichiometric ratios dictated by the equations listed above. Thus, a controller of the fuel cell system may monitor the output power of the stack and based on the monitored output power, estimate the fuel and air flows required to satisfy the power demand. In this manner, the controller regulates the fuel processor to produce this flow, and in response to the controller detecting a change in the output power, the controller estimates a new rate of fuel flow and controls the fuel processor accordingly.

The ratio of fuel or air provided to a fuel cell over what is theoretically required by a given power demand is sometimes referred to as "stoich". For example, 1 anode stoich refers to 100% of the hydrogen theoretically required to meet a given power demand, whereas 1.2 stoich refers to 20% excess hydrogen over what is theoretically required. Since in real conditions it is typical that not all of the hydrogen or air supplied to a fuel cell will actually react, it may be desirable to supply excess fuel and air to meet a give power demand.

The fuel cell system may provide power to a load, such as a load that is formed from residential appliances and electrical devices that may be selectively turned on and off to vary the power that is demanded. Thus, in some applications the load may not be constant, but rather the power that is consumed by the load may vary over time and change abruptly. For example, if the fuel cell system provides power to a house, different appliances/electrical devices of the house may be turned on and off at different times to cause the load to vary in a stepwise fashion over time.

There is a continuing need for integrated fuel cell systems designed to achieve objectives including the forgoing in a robust, cost-effective manner.

SUMMARY

The present invention provides in one aspect an integrated fuel cell system having a first reactor adapted to receive a hydrocarbon feed and at least partially convert the hydrocarbon feed into a first fuel stream comprising a first hydrogen concentration and a first carbon monoxide concentration. A second reactor is adapted to receive the first fuel stream from the first reactor and react a portion of the first carbon monoxide concentration with steam to produce a second fuel stream having a second hydrogen concentration and a second carbon monoxide concentration. The second hydrogen concentration is greater than the first hydrogen concentration, the second carbon monoxide concentration is lower than the first carbon monoxide concentration, and the second carbon monoxide concentration is at least 1,000 part per million. A fuel cell has a temperature of at least 100° C., wherein the fuel cell is adapted to receive the second fuel stream and react a portion of the second hydrogen concentration. The exhaust from the fuel cell comprises at least 1,000 parts per million carbon monoxide. An oxidizer is adapted to receive the exhaust and oxidize a portion of the carbon monoxide in the exhaust (e.g., preferably all of the CO).

Various embodiments of the invention can include the following features, alone or in combination. The first reactor being at least one of: a steam reforming reactor, a catalytic partial oxidation reactor, and an autothermal reactor. The hydrocarbon feed can comprise oxygen and steam. The hydrocarbon feed can comprise natural gas. The hydrocarbon feed can comprise a ratio of oxygen molecules to methane molecules in the range 0.50–0.6. The hydrocarbon feed can comprise a ratio of water vapor molecules to methane molecules in the range 2.5–4.0.

The second reactor can comprise a multi-stage shift reactor (see equation 5). The first reactor can comprise a conversion catalyst consisting essentially of platinum. In such embodiments, fuel cell catalyst components such as ruthenium alloys or mixtures are not needed due to the fact that the operating temperature of the fuel cell is relatively high (e.g., above 100° C.).

In addition to the first and second reactors, the fuel cell system can further include a third reactor adapted to receive the second fuel stream and react a portion of the second carbon monoxide concentration with oxygen to produce a third fuel stream having a lower carbon monoxide concentration than the second carbon monoxide concentration. In such embodiments, the third fuel stream is then injected into the fuel cell.

The fuel cell operating temperature can also be in the range 100–200° C., or preferably in the range 160–180° C. The fuel cell can include a polybenzimidazole polymer exchange membrane or other PEMs suitable for operating in such temperature ranges. The second carbon monoxide concentration can be over 3000 parts per million in some embodiments, and over 8000 parts per million in other embodiments.

In another aspect, the invention provides a method of operating a fuel cell system, containing the following steps: flowing a hydrocarbon through a conversion reactor to produce a first fuel stream comprising hydrogen and carbon monoxide; flowing the first fuel stream through a shift reactor to react a portion of the carbon monoxide with steam to produce a second fuel stream still having at least 1,000 parts per million carbon monoxide; flowing the second fuel stream directly from the shift reactor through a conduit to a fuel cell operating at a temperature greater than 100° C. to produce an exhaust stream comprising at least 1,000 parts per million carbon monoxide; and flowing the exhaust through an oxidizer to reduce the carbon monoxide to less than 100 parts per million.

In addition, such embodiments may also contain methods of operating a fuel cell system, embodying any of the following steps, either alone or in combination: flowing oxygen and steam through the conversion reactor, wherein the reactor is an autothermal reactor, wherein the hydrocarbon comprises natural gas, and wherein the natural gas comprises methane; flowing the methane through the conversion reactor at a first molar flow rate; flowing the oxygen through the conversion reactor at a second molar flow rate having a ratio in the range of 0.5–0.6 with respect to the first molar flow rate; and flowing the steam through the conversion reactor at a third molar flow rate having a ratio in the range of 2.5–4.0 with respect to the first molar flow rate. Such methods may relate to systems incorporating any of the features and operating conditions described above, either alone or in combination.

In another aspect, the invention provides another method of operating a fuel cell system, containing the following steps: converting a flow of hydrocarbon into a fuel stream comprising hydrogen and carbon monoxide; reacting a portion of the carbon monoxide with steam to produce additional hydrogen in the fuel stream; flowing the fuel stream through a polymer membrane fuel cell having a temperature greater than 100° C.; exhausting the fuel stream from the fuel cell, wherein the exhausted fuel stream comprises at least 1,000 parts per million carbon monoxide; and flowing the exhausted fuel stream to an oxidizer wherein the carbon monoxide in the exhausted fuel stream is reduced to a level less than 100 parts per million. Such embodiments may also incorporate any of the features described above, either alone or in combination.

Advantages and other features of the invention will become apparent from the following description, drawing and claims.

DETAILED DESCRIPTION

Figure 1:
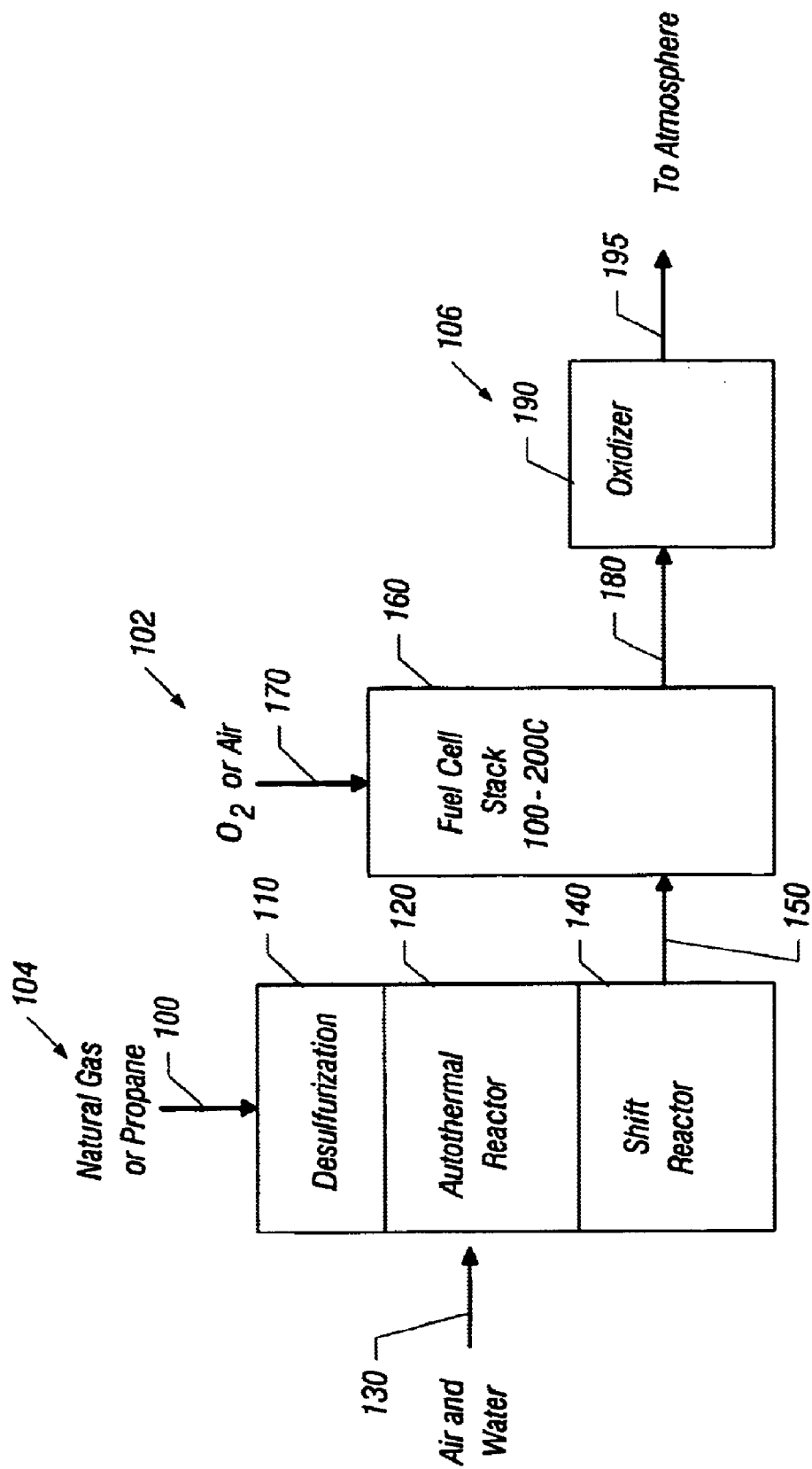
FIG. 1 shows a schematic diagram of an integrated fuel cell system.

Referring to FIG. 1, a fuel cell system 102 is shown integrated with a fuel processing system 104 and an exhaust gas oxidizing system 106. A hydrocarbon feed such as natural gas or propane is injected through conduit 100 into a de-sulfurization vessel 110 (e.g., containing a sulfur-adsorbent material such as activated carbon).

The de-sulfurized natural gas is injected into an autothermal reactor 120 (see equations (3) and (4)), also referred to herein as the first reactor. In some embodiments, the autothermal reactor can be substituted by a reforming reactor (e.g., utilizing the steam reforming reaction), or by a catalytic partial oxidation reactor. Air and water are also injected into the autothermal reactor 120. In some embodiments, the air and water can be injected up-stream from the autothermal reactor 120. It may be preferable to maintain a desired ratio of oxygen molecules to methane molecules (referred to as oxygen to carbon ratio) fed to the autothermal reactor 120 (e.g., 0.5–0.6). It may also be preferable to maintain a desired ratio of the steam molecules to the methane molecules (referred to as steam to carbon ratio) fed to the autothermal reactor 120 (e.g., 2.0–4.0). As an example, these ratios can be achieved by modulating the flow rates of these materials to achieve a desired molar flow rate.

The effluent from the autothermal reactor 120, generally referred to as reformate, and herein referred to as a first fuel stream, is then flowed to a shift reactor 140 (see equation (5)). In some embodiments, additional water may be injected into the shift reactor 140, for example, as needed to reduce CO. In additional embodiments, an additional shift reactor (sometimes collectively referred to as a multi-stage shift reactor) can be employed to provide improved performance (e.g., further CO reduction). The shift reactor effluent, sometimes referred to herein as a second fuel stream, is flowed through conduit 150 to the anode chambers (not shown) of fuel cells in a fuel cell stack 160. Likewise, air is flowed through conduit 170 through the cathode chambers of the fuel cells in the fuel cell stack 160.

In the fuel cell stack 160, a portion of the hydrogen in the reformate reacts with a portion of the oxygen in the air to generate electricity. The spent reformate stream is exhausted from the fuel cell stack 160 through conduit 180. The spent reformate generally contains residual hydrogen and carbon monoxide. Conduit 180 feeds the spent reformate to the gas oxidizing system 106, where such components are removed to desirable levels. The gas oxidizing system is sometimes referred to as an anode tailgas oxidizer (ATO). In some embodiments, the gas oxidizing system 106 can be a burner. In other embodiments, the gas oxidizing system can be a vessel maintained at a desired temperature (e.g., 800° C.) and containing a catalyst such as platinum suitable for promoting oxidization. Such arrangements are similar to automotive catalytic converter systems. In some embodiments, the spent air exhausted from the fuel cell stack (not shown) can be mixed with the spent reformate to provide the oxygen required by the gas oxidizing system 106. In some embodiments, the needed oxygen can be supplied or supplemented from ambient (not shown), such as by an air blower. In the embodiment shown in FIG. 1, the effluent from the gas oxidizing system is vented to ambient via conduit 195.

Figure 2:
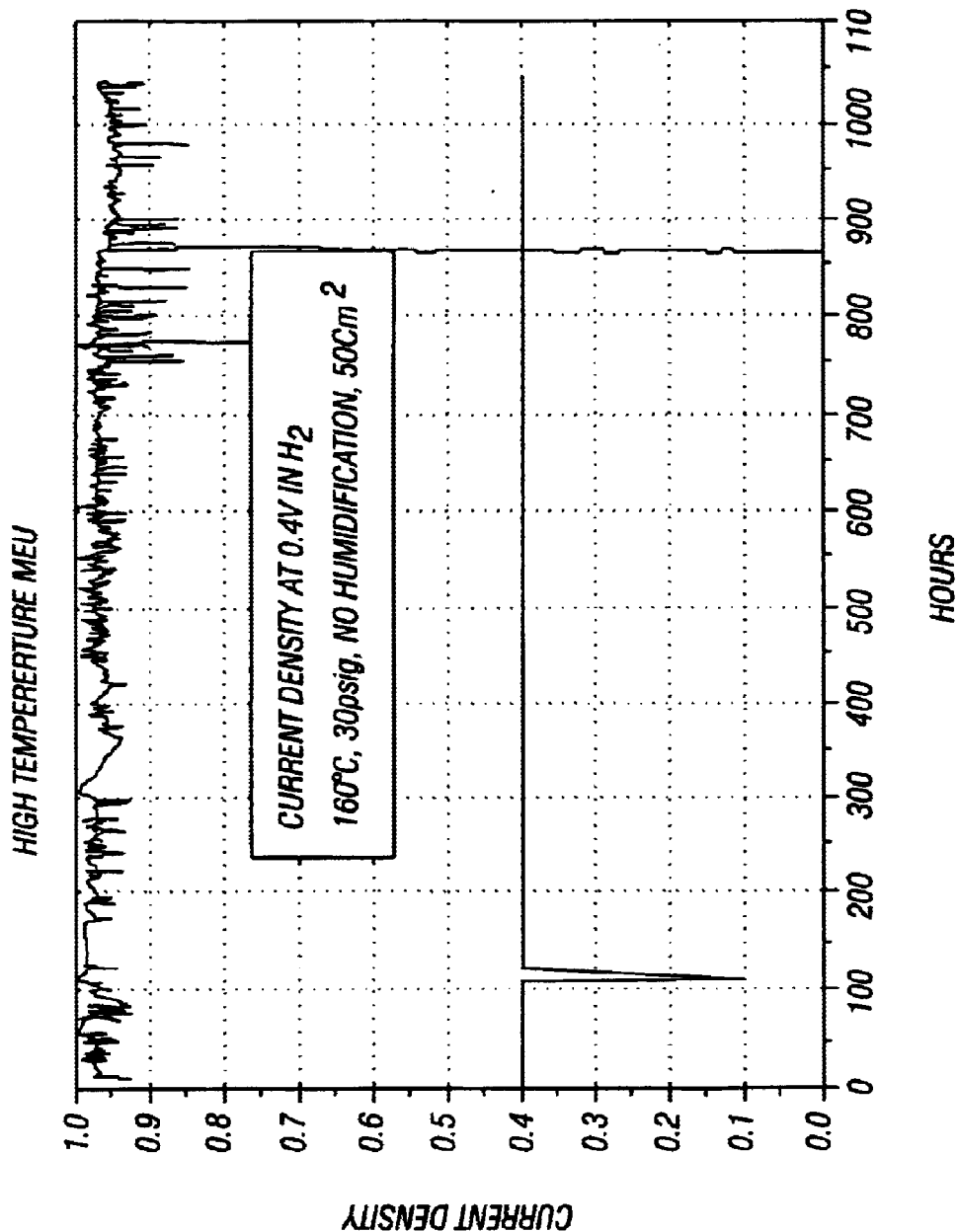
FIG. 2 shows a performance graph of the fuel cell stack depicted in FIG. 1.
Figure 4:
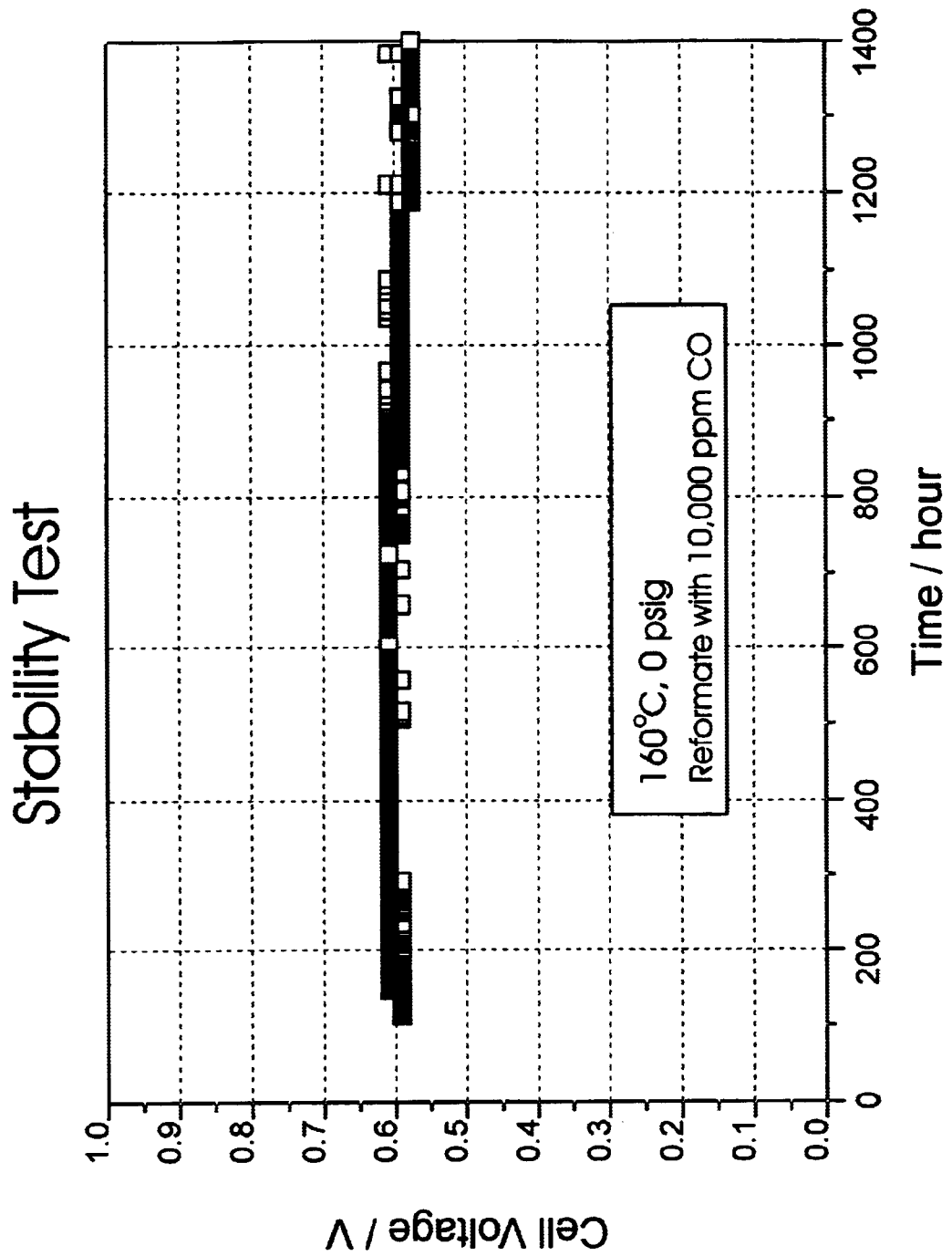
FIG. 4 shows a performance graph of the fuel cell stack depicted in FIG. 1.

One aspect of the present invention is the utilization of a PEM fuel cell stack that can operate at a temperature range of 100–200° C. At lower temperatures, such as the temperatures typically utilized by conventional PEMs like sulfonated fluouropolymers, carbon monoxide in the reformate tends to poison the catalyst in the fuel cell by adsorbing onto it and blocking reaction sites. In such systems, additional reactor stages are typically employed to keep carbon monoxide levels below a level that the fuel cell can accommodate (e.g., 50 parts per million). Operation at even higher temperature ranges such as 150–200° C. may also be desirable to assist carbon monoxide tolerance in the fuel cell. I Preferably, the PEM used in the fuel cell stack under the present invention is based on the polybenzimidazole (PBI) membrane available from Celanese. U.S. patents describing this material include U.S. Pat. Nos. 5,525,436, 6,099,988, 5,599,639, and 6,124,060, which are each incorporated herein by reference Referring to FIG. 2, a graph is shown plotting the performance of a fuel cell utilizing the PBI PEM at a temperature of 160° C., and utilizing a pure hydrogen fuel at about 30 psig. Referring to FIG. 4, a graph is shown plotting the performance of a fuel cell utilizing the PBI PEM at a temperature of 160° C., and utilizing a reformate fuel having about 10,000 ppm CO that is blown through the stack at near ambient pressure. As evident from the graph shown in FIG. 2, performance of the fuel cell is stable over a 1,000 hour time period, with a current density of approximately 0.4 volts per sqcm. As evident from the graph shown in FIG. 4, performance of the fuel cell is stable over a 1,400 hour time period, with an average cell voltage of about 0.6 Volts. Other high temperature PEM materials known in the art such as polyether ether ketone (PEEK) may also be used.

Figure 3:
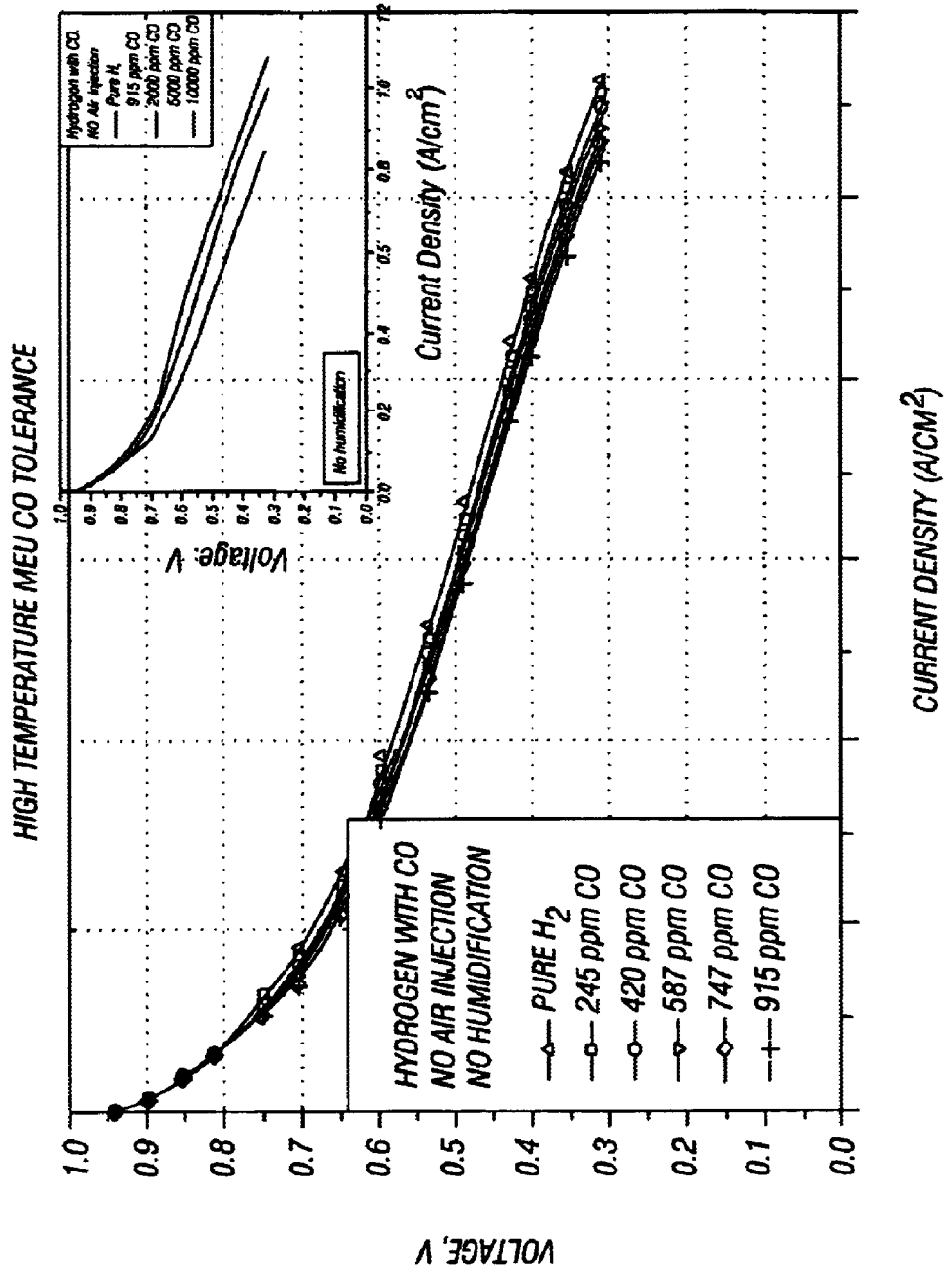
FIG. 3 shows a performance graph of the fuel cell stack depicted in FIG. 1.

Referring to FIG. 3, a graph is shown plotting the tolerance of a fuel cell under the present invention to various levels of carbon monoxide. As evident from the graph, carbon monoxide levels in the fuel stream of up to 1,000 parts per million have little effect on the polarization curve, and acceptable performance is shown where carbon monoxide levels in the fuel stream are even as high as 10,000 parts per million. Accordingly, in some embodiments, it may be desirable to configure the second reactor (shift reactor) such that it is effective to remove carbon monoxide levels in the fuel down to 8,000 parts per million, or down to 3,000 parts per million. As an example, this balance may be determined according to the performance of the fuel cell as a function of carbon monoxide levels, or it may otherwise be determined as an efficiency balance between the cost of multiple stage shift reactors and loss of performance due to higher CO concentrations, generating steam for the shift reaction and the benefit of the additional hydrogen produced.

The catalyst in the fuel cell can be platinum-based, as is known in the art. Since the fuel cell stack is tolerant to carbon monoxide, an advantage of the invention is that it is not necessary to include a ruthenium-based catalyst or platinum ruthenium alloy to improve carbon monoxide tolerance, as is common in the prior art, and thus the cost associated with the fuel cell stack is reduced. Thus, some embodiments utilize a catalyst consisting essentially of platinum (platinum is the only catalytically active material in the catalyst layer of the fuel cell).

Another advantage of some embodiments under the present invention is that since the fuel cell can accommodate relatively high levels of carbon monoxide (e.g., greater than 1,000 parts per million), the fuel processing system can be simplified to eliminate the PROX reactor, which is typically used to achieve carbon monoxide levels less than 100 parts per million. For safety purposes, it may still be necessary to avoid exhausting high levels of carbon monoxide to the atmosphere (e.g., greater than 100 parts per million). However, utilizing the gas oxidation system 106 to achieve low carbon monoxide emissions provides a cost reduction and system simplification by removing this function from the fuel processing system. Some embodiments may nevertheless utilize a PROX reactor or some other reactor to further reduce the carbon monoxide sent to the fuel cell. Such a reactor may be referred to herein as a third reactor, and the stream fed to the fuel cell may be referred to as a third fuel stream.

Another advantage of embodiments using a PBI-based PEM is that such systems do not require humidification of the PEM. Traditional PEMs such as sulfonated fluourocarbon polymers (e.g., Nafion), require that the PEM remain hydrated during the fuel cell reaction. To achieve this, such systems generally include a system to humidify the cathode air stream to prevent the air stream from drying out the PEM as the air is flowed through the fuel cell. Embodiments under the present invention provide a cost reduction and system simplification by eliminating the need for fuel cell reactant humidification systems. Another advantage is improved flexibility toward transient CO spikes, such as can occur when the fuel processing reactor conditions suddenly change (e.g., flow rates, temperatures, etc.).

While the above discussion describes a system using natural gas as a hydrocarbon feed source, it will be appreciated that other embodiments under the present invention can utilize other hydrocarbons, including but not limited to methanol, gasoline, etc.

In another aspect, the invention also provides a set of methods for achieving the foregoing objectives. Such methods may incorporate any of the above aspects, features, or considerations, either alone or in combination. As an example, a method of operating a fuel cell system is provided, containing the following steps:
(a) flowing a hydrocarbon through a conversion reactor to produce a first fuel stream comprising hydrogen and carbon monoxide;
(b) flowing the first fuel stream through a shift reactor to react a portion of the carbon monoxide with steam to produce a second fuel stream still having at least 1,000 parts per million carbon monoxide;
(c) flowing the second fuel stream directly from the shift reactor through a conduit to a fuel cell operating at a temperature greater than 100° C. to produce an exhaust stream comprising at least 1,000 parts per million carbon monoxide; and
(d) flowing the exhaust through an oxidizer to reduce the carbon monoxide to less than 100 parts per million.

Additional embodiments based on this method may also include any of the following details or steps, either alone or in combination:

(i) flowing oxygen and steam through the conversion reactor,
(ii) wherein the reactor is an autothermal reactor,
(iii) wherein the hydrocarbon comprises natural gas,
(iv) wherein the natural gas comprises methane; flowing the methane through the conversion reactor at a first molar flow rate;
(vi) flowing the oxygen through the conversion reactor at a second molar flow rate having a ratio in the range of 0.5–0.6 with respect to the first molar flow rate; and
(vii) flowing the steam through the conversion reactor at a third molar flow rate having a ratio in the range of 2.5–4.0 with respect to the first molar flow rate.

In another aspect, the invention provides an additional method of operating a fuel cell system, containing the following steps:
(a) converting a flow of hydrocarbon into a fuel stream comprising hydrogen and carbon monoxide;
(b) reacting a portion of the carbon monoxide with steam to produce additional hydrogen in the fuel stream;
(c) flowing the fuel stream through a polymer membrane fuel cell having a temperature greater than 120° C.;
(d) exhausting the fuel stream from the fuel cell, wherein the exhausted fuel stream comprises at least 1,000 parts per million carbon monoxide; and
(e) flowing the exhausted fuel stream to an oxidizer wherein the carbon monoxide in the exhausted fuel stream is reduced to a level less than 100 parts per million. Such embodiments may also incorporate any of the features described above, either alone or in combination.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. An integrated fuel cell system, comprising:
a first reactor adapted to receive a hydrocarbon feed and at least partially convert the hydrocarbon feed into a first fuel stream comprising a first hydrogen concentration and a first carbon monoxide concentration;
a second reactor adapted to receive the first fuel stream from the first reactor and react a portion of the first carbon monoxide concentration with steam to produce a second fuel stream having a second hydrogen concentration and a second carbon monoxide concentration;
wherein the second hydrogen concentration is greater than the first hydrogen concentration, wherein the second carbon monoxide concentration is lower than the first carbon monoxide concentration, wherein the second carbon monoxide concentration is at least 1,000 part per million;
a fuel cell having a temperature of at least 120° C., wherein the fuel cell is adapted to receive the second fuel stream and react a portion of the second hydrogen concentration, wherein an exhaust from the fuel cell comprises at least 1,000 parts per million carbon monoxide; and
an oxidizer adapted to receive the exhaust and oxidize a portion of the carbon monoxide in the exhaust.

2. The fuel cell system of claim 1, wherein the first reactor is at least one of: a steam reforming reactor, a catalytic partial oxidation reactor, and an autothermal reactor.

3. The fuel cell system of claim 1, wherein the first reactor is an autothermal reactor.

4. The fuel cell system of claim 3, wherein the hydrocarbon feed comprises oxygen and steam.

5. The fuel cell system of claim 4, wherein the hydrocarbon feed comprises natural gas.

6. The fuel cell system of claim 5, wherein the hydrocarbon feed comprises a ratio of oxygen molecules to methane molecules in the range 0.5–0.6.

7. The fuel cell system of claim 5, wherein the hydrocarbon feed comprises a ratio of water vapor molecules to methane molecules in the range 2.5–4.0.

8. The fuel cell system of claim 1, wherein the second reactor comprises a multi-stage shift reactor.

9. The fuel cell system of claim 1, wherein the first reactor comprises a conversion catalyst consisting essentially of platinum.

10. The fuel cell system of claim 1, wherein the fuel cell operating temperature is in the range 100–200° C.

11. The fuel cell system of claim 1, wherein the fuel cell operating temperature is in the range 160–180° C.

12. The fuel cell system of claim 1, wherein the fuel cell comprises a polybenzimidazole polymer exchange membrane.

13. The fuel cell system of claim 12, wherein the second carbon monoxide concentration is at least 3,000 parts per million.

14. The fuel cell system of claim 12, wherein the second carbon monoxide concentration is at least 8,000 parts per million.

15. A method of operating a fuel cell system, comprising:

flowing a hydrocarbon through a conversion reactor to produce a first fuel stream comprising hydrogen and carbon monoxide;

flowing the first fuel stream through a shift reactor to react a portion of the carbon monoxide with steam to produce a second fuel stream still having at least 1,000 parts per million carbon monoxide;

flowing the second fuel stream directly from the shift reactor through a conduit to a fuel cell operating at a temperature greater than 120° C. to produce an exhaust stream comprising at least 1,000 parts per million carbon monoxide; and flowing the exhaust through an oxidizer to reduce the carbon monoxide to less than 100 parts per million.

16. The method of claim 15, further comprising:

flowing oxygen and steam through the conversion reactor, wherein the reactor is an autothermal reactor, wherein the hydrocarbon comprises natural gas, and wherein the natural gas comprises methane.

17. The method of claim 16, further comprising:

flowing the methane through the conversion reactor at a first molar flow rate;

flowing the oxygen through the conversion reactor at a second molar flow rate having a ratio in the range of 0.5–0.6 with respect to the first molar flow rate; and flowing the steam through the conversion reactor at a third molar flow rate having a ratio in the range of 2.5–4.0 with respect to the first molar flow rate.

18. The method of claim 15, wherein the fuel cell operating temperature is in the range 150–200° C.

19. The method of claim 15, wherein the fuel cell comprises a polybenzimidazole polymer exchange membrane.

20. The fuel cell system of claim 19, wherein the second carbon monoxide concentration is at least 3,000 parts per million.

\* \* \* \* \*